June 4, 1940. H. JUNGE 2,203,198
LAWN MOWER
Filed Aug. 30, 1939
*Fig. 1.*
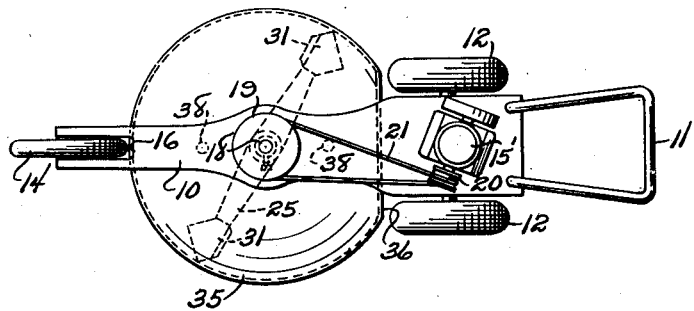
*Fig. 2.*
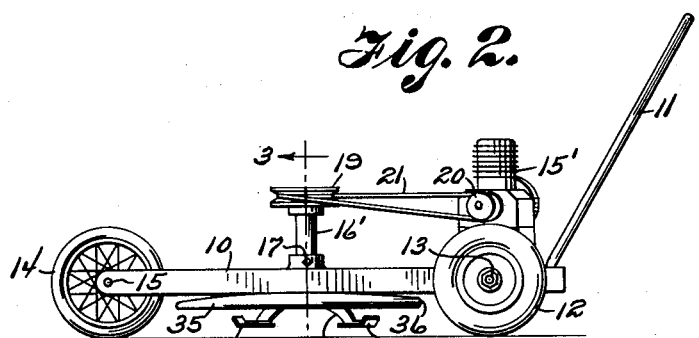
*Fig. 4.*     *Fig. 3.*     *Fig. 6.*
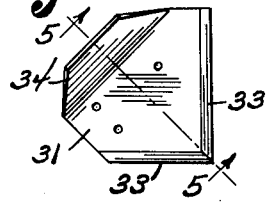 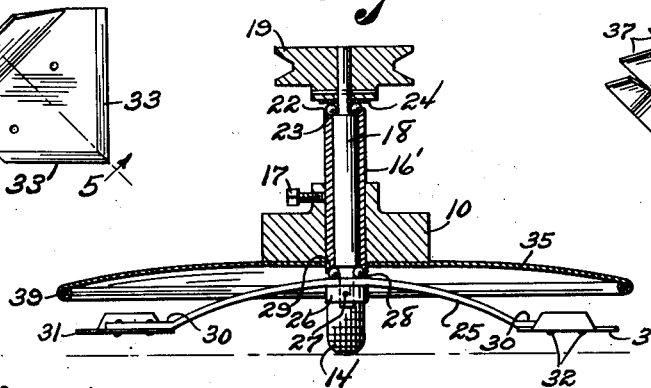 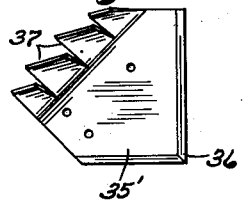
*Fig. 5.*
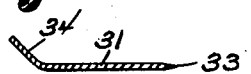
Herman Junge
INVENTOR
BY Victor J. Evans & Co.
ATTORNEYS Patented June 4, 1940

2,203,198

UNITED STATES PATENT OFFICE 2,203,198

LAWN MOWER

Herman Junge, Annapolis, Md.

Application August 30, 1939, Serial No. 292,713

1 Claim. (Cl. 56—25.4)

This invention relates to lawn mowers and has for an object to provide a power driven lawn mower which will cut any kind of grass or weeds from one inch to three feet high and will cut close up to within one-half inch along fencing, shrubbery and trees, and at the same time will cut grass in such minute particles and dispose them at the roots of grass so that raking is unnecessary as well as trimming will also be unnecessary.

A further object is to provide a lawn mower that is light and easy to use.

A further object is to provide a lawn mower which will be supported by two ground wheels in rear and one in front, the front ground wheel being slightly less in diameter than the rear ground wheels so that cutting under shrubbery will be easier than hitherto possible.

A further object is to provide a lawn mower which is better balanced than conventional lawn mowers and in which the two rear wheels are always on grass that is already cut.

A further object is to provide a novel cutter blade on each end of the cutter arm having the rear end bent upward to provide a suction fan which will lift up grass that is on the ground so that the next succeeding blade will cut it off.

A further object is to provide a novel cutter blade having flanges adapted to create a draft from the outside of a radius of the cutter blade and draw grass into the cutter blades to be severed by the next succeeding cutter blade.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a top plan view of a lawn mower constructed in accordance with the invention.

Figure 2 is a side elevation of the lawn mower.

Figure 3 is a cross sectional view of the lawn mower, drawn to large scale, and taken on the line 3—3 of Figure 1.

Figure 4 is a top plan of one of the cutter blades of the cutter arm.

Figure 5 is a cross sectional view of the cutter blade taken on line 5—5 of Figure 4.

Figure 6 is a top plan modified form of the cutter blade.

Referring now to the drawing in which like characters of reference designate similar parts in the various views, 10 designates a long narrow bed plate. An inverted U-shaped handle 11 extends upwardly and rearwardly from the rear end of the plate for manually maneuvering the lawn mower. A pair of ground wheels 12 are mounted on a rear axle 13 which is secured in any preferred manner to the rear end of the plate. These ground wheels preferably have rubber tires and are disposed close to the sides of the plate. A ground wheel 14, of smaller diameter than the rear ground wheels, is disposed on a short front axle 15 which is journaled in the wall of a slot 16 formed in the front end of the longitudinal median line of the plate and which receives the front wheel, which latter also is preferably provided with a rubber tire.

A small horse power conventional internal combustion engine 15 is mounted on the plate slightly in rear of the rear axle 13 so that the weight of the engine will tend to tip up the front of the plate on the rear ground wheels as fulcrums when the handle 11 is depressed to permit the lawn mower effectively mowing down tall grass and to promote maneuvering the lawn mower.

As best shown in Figure 3 a sleeve 16 is mounted to extend vertically through the plate substantially midway of the ends of the plate and is held in adjusted positions by a set screw 17 engaged through a boss in the plate. A shaft 18 extends through the sleeve and is equipped at the upper end with a driving pulley 19 which is connected to the power takeoff pulley 20 of the engine by a belt drive 21. Ball bearings 22 are disposed in a seat 23 formed at the top edge of the sleeve 16 and a washer 24 is interposed between the ball bearings and the bottom of the pulley 19.

An arched cutter arm 25 is secured midway of its ends to the power driven shaft 18 below the plate 10 through the medium of a washer 26 and a set screw 27. Ball bearings 28 are confined in a seat 29 formed in the lower edge of the sleeve 16 and bear upon the top of the cutter arm. The cutter bar ends 30 are straight and are spaced about one inch, more or less, from the ground in order to properly dispose the knives to cut the grass very short.

At each end of the cutter arm a substantially triangular cutter blade 31 is secured by rivets 32 or other connectors. The leading edge of the blade is substantially V-shaped and is sharpened as shown at 33. The rear portion of the blade is bent upwardly and rearwardly at the rear edge to provide a flange 34, which forms a fan blade adapted to create an upward suction and lift grass which is bent down so that the next succeeding cutter blade may sever it.

A guard plate 35 of substantially circular contour, and having a straight rear edge 36 is rigidly secured to the bottom of the plate 10, concentric with the shaft 18, by screws 38 or other connectors. The edge of the guard plate is rolled upon itself to form a bead 39. The bead is spaced about one-half inch outside of the path of the cutter blades. The edge of the guard plate extends laterally beyond the rear ground wheels 12.

In operation the operator grasps the handle 11 and maneuvers the lawn mower over the grass to be cut. Since the guard plate is of such diameter as to extend laterally beyond the rear wheels, as shown in Figure 1, the rear wheels will always travel on cut grass. The operator may place either side of the edge of the circular guard plate against fencing, trees, shrubbery, and the like or between rows of shrubbery and maneuver the lawn mower in such a manner as to cut the grass close up to within one-half inch of the same without interference by the ground wheels 12 since the latter are close to the bed plate 10 inside of the boundary edge of the guard plate as shown in Figure 1. By virtue of the fan blade of each cutter bar creating an up draft grass which is bent down onto the ground will be lifted and severed by the next advancing cutter blade. In practice, since the cutter arm rotates at a speed of about 1200 to 1750 revolutions a minute, the grass will be almost instantly severed into extremely minute particles which drop down under the roots of the cut grass so that raking is unnecessary and also trimming is rendered unnecessary.

A modified form of cutter blade 35 is shown in Figure 6, the same having a V-shaped sharpened edge 36 and being provided at the rear edge with a plurality of upwardly curved flanges 37. The flanges are set at a slight pitch to the blade and are sufficiently spaced to draw air between them laterally. These flanges form fan blades which create an inward suction, that is, a draft from outside of the radius of the cutter bar, to draw grass into the cutter without the lawn mower being maneuvered too close to fencing, shrubbery and the like.

From the above description it is thought that the construction and operation of the invention will be thoroughly understood without further explanation.

What is claimed is:

A lawn mower comprising an elongated base plate, a front ground wheel on the plate, an axle at the rear end of the plate, ground wheels on the axle outside of the plate, an internal combustion engine on the plate above the rear of the rear axle, an upwardly inclined handle on the rear end of the plate, the weight of the engine tending to tip up the front end of the plate on the rear wheels as fulcrums when the handle is depressed, a vertically disposed shaft journaled in the plate and projecting above and below the plate, the front ground wheels, the shaft and the engine being disposed on the longitudinal median line of the plate, a belt drive connecting the engine with the upper end of the shaft, a substantially circular convex guard plate secured to the bottom of the plate concentric with the shaft and having a straight rear edge adjacent to the rear ground wheels, the plate projecting laterally beyond both rear ground wheels and having a beaded edge adapted to engage obstructions on both longitudinal sides of the plate to permit the lawn mower operating close to rows of plants and between rows of plants without interference by the rear ground wheels, an arched cutter bar centrally secured to the lower end of the shaft below the plate, and cutter blades on the ends of the bars having upturned rear ends forming fans to lift fallen grass to be cut by the blades, the convex guard plate projecting laterally beyond the path of the cutter blades to deflect severed grass back to the ground, the convex shape of the guard plate promoting grass outside of the plate being drawn laterally underneath the plate by suction of the blades to be cut without the lawn mower being maneuvered too close to fences, shrubbery and the like.

HERMAN JUNGE.